Patented Dec. 11, 1951

2,577,829

UNITED STATES PATENT OFFICE 2,577,829

PRODUCTION OF UNSATURATED ACIDS

Frederick C. Visor, Philadelphia, Pa., assignor to Publicker Industries Inc., Philadelphia, Pa., a corporation of Pennsylvania No Drawing. Application August 9, 1947, Serial No. 767,848

1 Claim. (Cl. 260—530)

The present invention relates to a method for converting unsaturated aldehydes into their corresponding acids. More particularly, it is concerned with a novel process for producing unsaturated acids, such as crotonic acid, by the direct catalytic liquid phase oxidation of the corresponding, unsaturated aldehyde in the presence of a peroxide other than a peroxide of an organic acid.

In the past, unsaturated acids have been prepared by the direct catalytic oxidation of the corresponding aldehydes. For example, in U. S. Patent No. 2,183,325, granted December 12, 1939, to H. P. Staudinger, a process is described for the preparation of acids, such as crotonic acid, by the oxidation of unsaturated aldehydes in an acidified medium, using as a catalyst for the reaction, a per-compound of an organic acid that is completely soluble in the aldehyde employed. The acid obtained by this procedure, however, contains a substantial quantity of side reaction products which render it inferior for the various uses and processes that require a relatively pure compound. Thus, in order to obtain the acid in a form that is unobjectionable both from the standpoint of purity and color, it is necessary to carry out a number of recrystallizations and/or fractional distillation steps.

I have now discovered that unsaturated acids of the above mentioned type can be prepared in a highly purified form without the necessity of additional recrystallization and/or distillation steps and without the occurrence of appreciable undesirable side reactions. In this connection it should be noted that while the description which follows concerns the application of the present invention to the production of crotonic acid from crotonaldehyde, it is to be strictly understood that my invention is equally applicable to the production of unsaturated acids in general, and particularly the $\alpha,\beta$ unsaturated acids such as cinnamic acid, methacrylic acid, acrylic acid, 2-pentenoic acid, 2-hexenoic acid and the like having from 3 to 6 carbon atoms in the unsaturated chain. In accordance with the process of my invention, a solution of pure crotonaldehyde or an aqueous solution of crotonaldehyde that is initially substantially acid free and, which contains a peroxide compound as a catalyst, is contacted preferably at elevated temperature with oxygen, air, or other oxygen-containing gas, or a substance which under the reaction conditions liberates oxygen. Completion of the reaction is evidenced by the failure of the reaction mixture to absorb additional oxygen. The crotonic acid thus produced is then separated from the reaction mixture by means of filtration or distillation at reduced pressure, depending on the nature of the solvent medium utilized. In this connection, I have observed that in carrying out the process of my invention, if a substance such as ligroin or other similar hydrocarbon material is employed as a solvent for the reaction, the crotonic acid will be observed to precipitate from the reaction mixture in the form of a white crystalline product as the reaction proceeds. With other solvents such as benzene, acetone and the like, the crotonic acid is somewhat more soluble therein, and as a result, is generally separated from the reaction mixture by distilling off the solvent at reduced pressure. The residue thus obtained which consists essentially of unconverted crotonaldehyde and crotonic acid may then be chilled in order to precipitate the crotonic acid present therein. The resulting white crystalline product may then be washed with a suitable material such as ether and the substantially pure acid isolated by filtration. The crystalline acid obtained in this manner melts sharply at 72° C.

The process of my invention may be effected at temperatures varying from approximately 0° C. or thereabouts, to about 50° C. In general, however, I have found it preferable to carry out the oxidation at a temperature of about 35° C. Temperatures appreciably in excess of 50° C. result in the procurement of low yields and are generally to be regarded as rather hazardous in as much as the presence of peroxides in a reaction mixture of the type here involved frequently becomes uncontrollable at temperatures substantially in excess of about 50° C. I have also found that the process of my invention may be carried out at elevated pressures provided adequate control of the reaction conditions is maintained in order to avoid the danger of an explosion.

The peroxide compounds that I have found suitable for use in my process are hydrogen peroxide, benzoyl peroxide, peroxides of tertiary alcohols such as tertiary amyl hydroperoxide and tertiary butyl hydroperoxide, ammonium persulfate, potassium persulfate, sodium perborate, per acetic acid anhydride, and the like. Such compounds are to be distinguished from the various oxygen carrying salts such as cadmium crotonate, manganese acetate, cadmium acetate, and the like. While I have found that the latter compounds do serve to increase the oxygen absorption and the conversion of aldehyde, the yield of the corresponding acid is materially reduced since the presence of such oxygen carriers in the reaction mixture tends to catalyze undesirable side reactions.

The quantity of catalyst employed may vary within a relatively wide range. Generally speaking, however, concentrations of the order of about 0.1% to about 5%, and preferably around 1%, based on the weight of the aldehyde, will give very satisfactory results.

The rate at which oxygen is introduced into the reaction mixture may likewise vary. In general, however, oxygen may be introduced into the reaction mixture at the rate of between about 20 to 30 liters per hour, and preferably at about 25 liters per hour (at a reaction temperature of 35° C. and standard pressure). Air or oxygen-containing gases whose remaining components are substantially inert with respect to the reaction mixture may be employed in place of pure oxygen, which I consider an equivalent of the aforesaid gases, and should preferably be introduced at a rate such that the oxygen contained therein is introduced at a rate of from about 20 to 25 liters per hour.

My invention may be further illustrated by the following specific examples:

Example 1

To a solution of 140 grams of crotonaldehyde dissolved in 140 grams of benzene is added 1.4 grams of ammonium persulfate. Oxygen is next introduced into the reaction mixture at a temperature of 35° C. (750 mm.) and at a rate of 25 liters per hour for a period of seven and three-quarter hours. At the end of this time the reaction mixture is subjected to distillation at a pressure of 20 mm. to yield 155 grams of distillate which consists principally of benzene. The residue of 145 grams on cooling gives a yield of 84 grams of pure white crotonic acid corresponding to a yield of 62% on a 78% conversion.

Example 2

To a solution consisting of 140 grams of crotonaldehyde dissolved in 140 grams of ligroin, tertiary butyl hydroperoxide is added in a concentration of 1%, based on the weight of crotonaldehyde present. Oxygen is next introduced into the reaction mixture at a rate of 23 liters per hour at a temperature of 35° C. (750 mm.) and as the reaction proceeds crotonic acid is observed to precipitate in the form of a white crystalline product. After a period of six and one-half hours oxygen absorption ceases. On allowing the mixture to stand at room temperature, additional crotonic acid precipitates. The yield of acid thus obtained corresponds to 72% on an 85% conversion. The acid is dried by washing once with ether and melts at 72° C.

Example 3

A solution of crotonaldehyde similar in composition to that described in Example 1, with the exception of the substitution of 0.1% benzoyl peroxide for the catalyst used therein, is subjected to oxidation under the same conditions for a period of five hours to give a 62% yield of pure crotonic acid.

Example 4

A solution of crotonaldehyde similar in composition to that described in Example 2, with the exception of the substitution of 1% hydrogen peroxide for the catalyst use therein, is subjected to oxidation for a period of six hours to give a 62.8% yield of pure crotonic acid.

Example 5

Oxygen is introduced into a solution consisting of 140 grams of crotonaldehyde (crude 91%) 140 grams of benzene and 1.4 grams of tertiary butyl hydroperoxide at the rate of 25 liters per hour at a temperature of 30 to 35° C. (750 mm.). After a period of six and one-quarter hours oxygen absorption ceases. The reaction mixture is then subjected to fractional distillation under reduced pressure as above to give 96 grams of pure white crotonic acid. The acid is dried by washing once with ether and melts at 72° C. The yield of crotonic acid thus obtained is 72% based on an 85% conversion which corresponds to a yield of 88% by weight, based on the crotonaldehyde converted.

It will be apparent to those skilled in the art that the process of my invention is susceptible of numerous modifications without departing from the scope thereof. In general, it may be said that the use of any equivalents or modifications of procedure which would normally occur to one skilled in the art, in view of the foregoing disclosure, are to be construed as lying within the scope of my invention.

What I claim is:

In a method for the preparation of crotonic acid by the catalytic liquid phase oxidation of crotonaldehyde, the improvement which comprises introducing oxygen into an initially substantially acid free solution comprising essentially crotonaldehyde, dissolved in ligroin, and from about 0.1% to about 5% of tertiary butyl hydroperoxide, based on the weight of the crotonaldehyde present, whereby the crotonic acid precipitates in the form of a white crystalline product as it is produced.

FREDERICK C. VISOR.

REFERENCES CITED

The following references are of record in the file of this patent:

UNITED STATES PATENTS

| Number | Name | Date |
|---|---|---|
| 1,911,219 | Bauer et al. | May 30, 1933 |
| 2,153,406 | Bauer | Apr. 4, 1939 |
| 2,183,325 | Staudinger | Dec. 12, 1939 |
| 2,413,235 | Kennedy | Dec. 24, 1946 |

OTHER REFERENCES

Duchesne et al., Bull. Soc. Chim. de France, vol. 35, pp. 1313–1314 (1925).